(12) United States Patent
Wang et al.

(10) Patent No.: US 11,505,706 B2
(45) Date of Patent: Nov. 22, 2022

(54) PAINT BASED ON GRAPHENE NANO CONTAINER AND SELF-REPAIRING COATING AS WELL AS PREPARATION METHOD AND APPLICATION THEREOF

(71) Applicant: NINGBO INSTITUTE OF MATERIALS TECHNOLOGY & ENGINEERING, CHINESE ACADEMY OF SCIENCES, Ningbo (CN)

(72) Inventors: Liping Wang, Ningbo (CN); Haichao Zhao, Ningbo (CN); Chengbao Liu, Ningbo (CN); Yuwei Ye, Ningbo (CN)

(73) Assignee: NINGBO INSTITUTE OF MATERIALS TECHNOLOGY & ENGINEERING, CHINESE ACADEMY OF SCIENCES, Ningbo (CN)

( * ) Notice: Subject to any disclaimer, the term of this patent is extended or adjusted under 35 U.S.C. 154(b) by 363 days.

(21) Appl. No.: 16/630,489

(22) PCT Filed: Aug. 16, 2018

(86) PCT No.: PCT/CN2018/100812
§ 371 (c)(1),
(2) Date: Jan. 13, 2020

(87) PCT Pub. No.: WO2020/034141
PCT Pub. Date: Feb. 20, 2020

(65) Prior Publication Data
US 2021/0062011 A1    Mar. 4, 2021

(51) Int. Cl.
| | |
|---|---|
| C09D 5/08 | (2006.01) |
| C09D 163/00 | (2006.01) |
| C09D 7/20 | (2018.01) |
| C09D 7/42 | (2018.01) |
| B82Y 30/00 | (2011.01) |
| B82Y 40/00 | (2011.01) |
| C08K 5/3437 | (2006.01) |
| C08K 5/3475 | (2006.01) |
| C08K 5/47 | (2006.01) |
| C08K 9/10 | (2006.01) |

(52) U.S. Cl.
CPC .............. *C09D 5/086* (2013.01); *C09D 7/20* (2018.01); *C09D 7/42* (2018.01); *C09D 163/00* (2013.01); *B82Y 30/00* (2013.01); *B82Y 40/00* (2013.01); *C08K 5/3437* (2013.01); *C08K 5/3475* (2013.01); *C08K 5/47* (2013.01); *C08K 9/10* (2013.01); *C08K 2201/011* (2013.01)

(58) Field of Classification Search
CPC .............................. C09D 163/00; C09D 5/086
See application file for complete search history.

(56) References Cited

U.S. PATENT DOCUMENTS

2015/0094400 A1 * 4/2015 Zheng .................... C08L 63/00
252/182.13

OTHER PUBLICATIONS

He, et al., "Fabrication Study of a New Anticorrosion Coating Based on Supramolecular Nanocontainer," Synthetic Metals 212 (2016) 186-194.*

* cited by examiner

*Primary Examiner* — Vickey Nerangis
(74) *Attorney, Agent, or Firm* — Bayramoglu Law Offices LLC

(57) ABSTRACT

The present application discloses paint based on a graphene nano container and a self-repairing coating as well as a preparation method and application thereof. The paint comprises a first component comprising 20~40 parts by weight of epoxy resin; a second component comprising 0.1~2 parts by weight of corrosion inhibitor-loaded graphene nano container, 1 part by weight of diluent, 30~60 parts by weight of epoxy curing agent, 1 part by weight of defoaming agent and 1 part by weight of flatting agent, wherein the corrosion inhibitor-loaded graphene nano container comprises graphene grafted with cyclodextrin and the corrosion inhibitor reversely binding to the cyclodextrin. The paint of the present application is simple in preparation process, green and environmental friendly in raw material, low in price and available, and meanwhile the self-repairing coating formed thereof is excellent in protection performance.

7 Claims, 4 Drawing Sheets

PAINT BASED ON GRAPHENE NANO CONTAINER AND SELF-REPAIRING COATING AS WELL AS PREPARATION METHOD AND APPLICATION THEREOF

TECHNICAL FIELD

The present application relates to an anti-corrosion coating, and particularly to paint based on a graphene nano container and a self-repairing coating as well as a preparation method and application thereof, belonging to the technical field of metal anticorrosion.

BACKGROUND

Graphene, as a two-dimensional nano material, has excellent chemical stability, permeability resistance and mechanical property. In the field of metal anticorrosion, preparation of a graphene-based composite coating has attracted a great interest of anticorrosion workers. However, phenomena such as pinholes and microcracks can occur on the surface of the coating during the long-term service of the coating, causing local corrosion of metal and greatly reducing the service life of the coating. The protectiveness of the anti-corrosion coating having a self-repairing ability can be recovered to a certain extent through physical and chemical actions after the coating has defects, thereby effectively improving the protective performance of the coating.

There are two kinds of researches on self-repairing anti-corrosion coatings: one research is that the defects of the coating are repaired by utilizing a polymer capsule coated healing agent through crosslinking and curing reactions. However, microcapsules required for this kind of self-repairing coating are large in size, which has a certain impact on the compactness of the coating film, thereby limiting its wide application. The other research is that a protective film is adsorbed and formed on the surface of bare metal by using a nano container encapsulated corrosion inhibitor and by utilizing the coordination between the corrosion inhibitor and a metal substrate so as to prevent oxidation reaction of metal. The commonly used nano container is made of a mesoporous and porous material and is spherical or tubular in most cases, thereby being unable to provide a good shielding effect for the coating.

At present, there are many researches on improvement of graphene modified organic coatings and there are also many methods on preparation of self-repairing anti-corrosion coatings, but most of them only focus on the sole function of graphene nanosheets (passive anticorrosion) or microcapsules (active anticorrosion). Meanwhile, there are few studies on improvement of passive and active anti-corrosion performances of the coating.

SUMMARY

The objective of the present application provides paint based on a graphene nano container and a self-repairing coating as well as a preparation method and application thereof, thereby overcoming the shortages of the existing technology.

In order to realize the objective of the disclosure, the technical solution adopted by the disclosure comprises:

An embodiment of the present application provides paint based on a graphene nano container, comprising:

a first component comprising 20~40 parts by weight of epoxy resin;

a second component comprising 0.1~2 parts by weight of corrosion inhibitor-loaded graphene nano container, 1 part by weight of diluent, 30~60 parts by weight of epoxy curing agent, 1 part by weight of defoaming agent and 1 part by weight of flatting agent;

the corrosion inhibitor-loaded graphene nano container comprising graphene grafted with cyclodextrin and the corrosion inhibitor reversely binding to the cyclodextrin.

An embodiment of the present application also provides a method for preparing the paint, comprising: sufficiently mixing 0.1~2 parts by weight of corrosion inhibitor-loaded graphene nano container with 1 part by weight of diluent, then adding 30~60 parts by weight of epoxy curing agent, 1 part by weight of defoaming agent and 1 part by weight of flatting agent, and subsequently, sufficiently mixing with 20~40 parts by weight of epoxy resin to prepare the paint.

An embodiment of the present application also provides a self-repairing coating formed by any one paint mentioned above.

An embodiment of the present application also provides a preparation method of a self-repairing coating, comprising:

providing any one paint mentioned above; and sufficiently mixing the first component of the paint with the second component, curing for 40~50 h at room temperature, and then curing for 3~5 h at 40~50° C.

an embodiment of the present application also provides use of any one paint mentioned above or the self-repairing coating mentioned above in metal anticorrosion.

Compared with the prior art, the present application at least has the advantages:

(1) the coating based on the graphene nano container provided in the present application can simultaneously realize improvement of shielding performance (passive anticorrosion) and self-repairing performance (active anticorrosion) of the anti-corrosion coating, gives a full play to an obstruction effect of graphene on a corrosive medium in an organic coating, and meanwhile endows the anti-corrosion coating with a self-repairing function.

(2) The self-repairing anti-corrosion coating based on the graphene nano container provided by the present application can form an adsorption film on the surface of metal depending on the corrosion inhibitor released in the graphene nano container and based on coordination with the metal substrate after generating mechanical injury and coating defects, thereby effectively improving the long-term protectiveness of the coating.

(3) The paint based on the graphene nano container provided by the present application is simple in preparation method, green and environmental friendly in raw materials and wide in source. At the same time, the self-repairing coating formed by the paint has excellent protection performance, can be widely applied to the fields of metal anti-corrosion paint, such as ocean facilities, shipping equipment and nuclear power industry.

BRIEF DESCRIPTION OF THE DRAWINGS

For better clearly explaining the embodiments of the present application or the technical solution in the prior art, drawings used in examples or description in the prior art will be simply described. Apparently, the drawings in the following description are only some embodiments of the present application, and those skilled in the art can also make other drawings according to these drawings without creative efforts.

DESCRIPTION OF THE EMBODIMENTS

Figure 1:
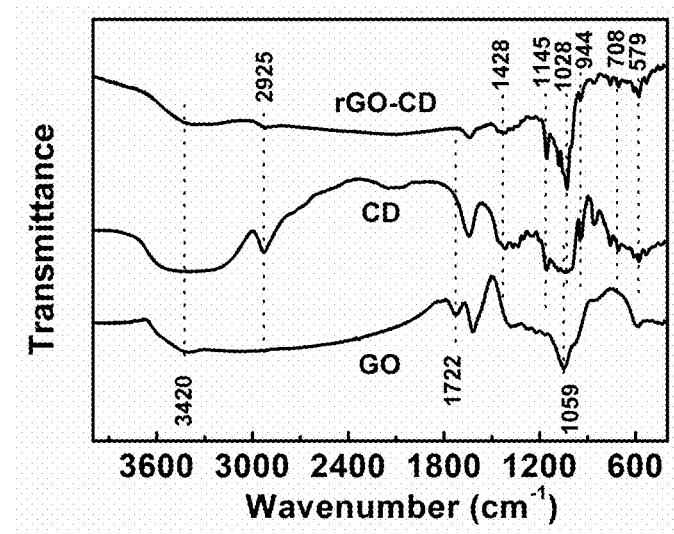
FIG. 1 is an infrared spectrum of a graphene nano container obtained according to an embodiment of the present application.
Figure 2A:
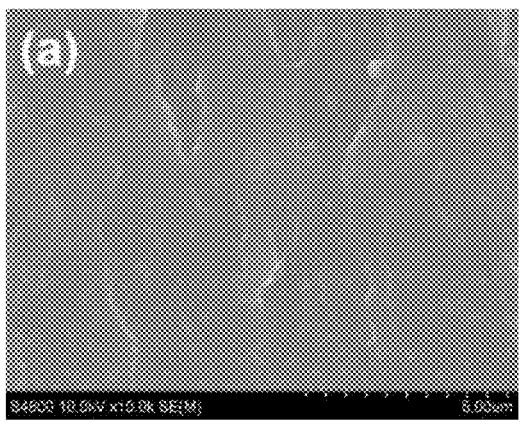
FIG. 2a-FIG. 2e respectively show scanning electron micrographs (SEM) of cross sections of a pure epoxy coating in control example 1, a graphene oxide/epoxy coating in control example 3, a corrosion inhibitor-reduced graphene oxide/epoxy coating in control example 4, a graphene nano container/epoxy coating in control example 2 and a corrosion inhibitor-loaded graphene nano container/epoxy coating in example 1.
Figure 2B:
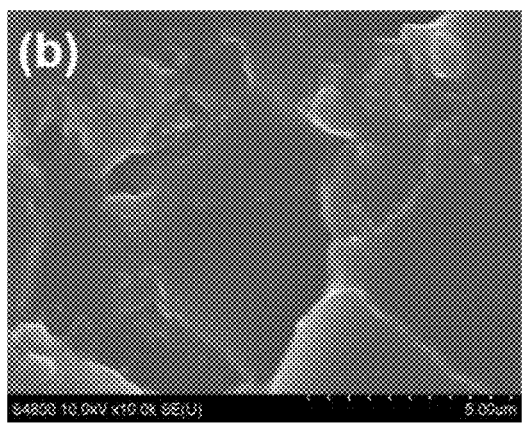
Figure 2C:
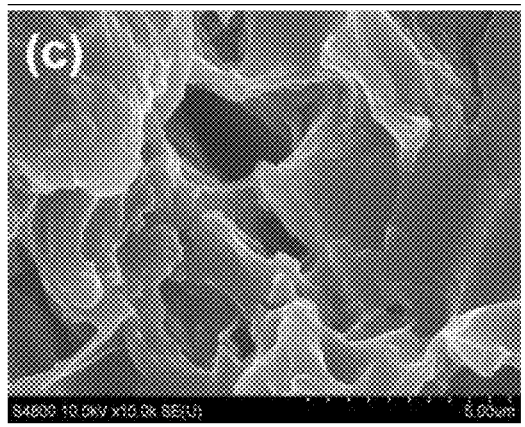
Figure 2D:
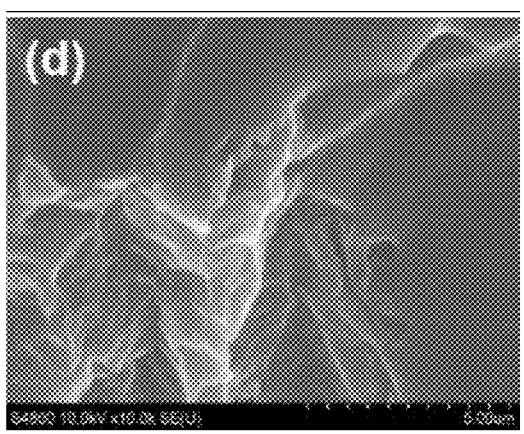
Figure 2E:
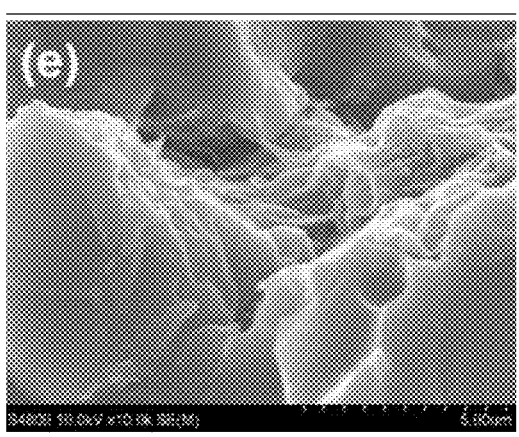
Figure 3A:
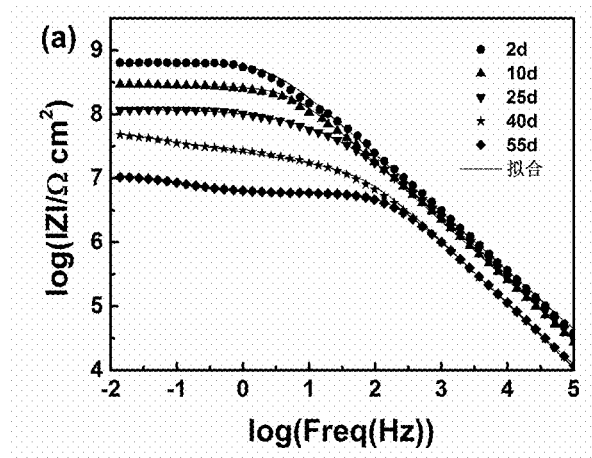
FIG. 3a-FIG. 3e respectively show electrochemical impedance spectrums of a pure epoxy coating in control example 1, a graphene oxide/epoxy coating in control example 3, a corrosion inhibitor-reduced graphene oxide/epoxy coating in control example 4, a graphene nano container/epoxy coating in control example 2 and a corrosion inhibitor-loaded graphene nano container/epoxy coating in control example 1 in 3.5 wt % NaCl solution at different soaking times.
Figure 3B:
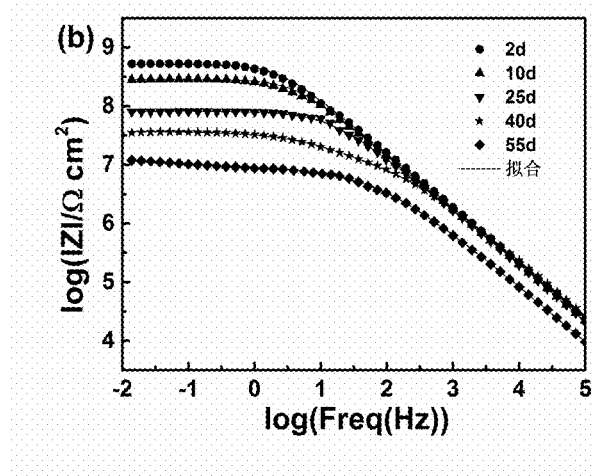
Figure 3C:
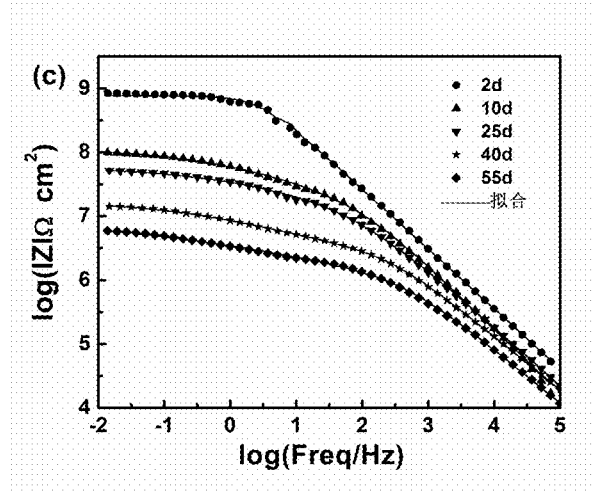
Figure 3D:
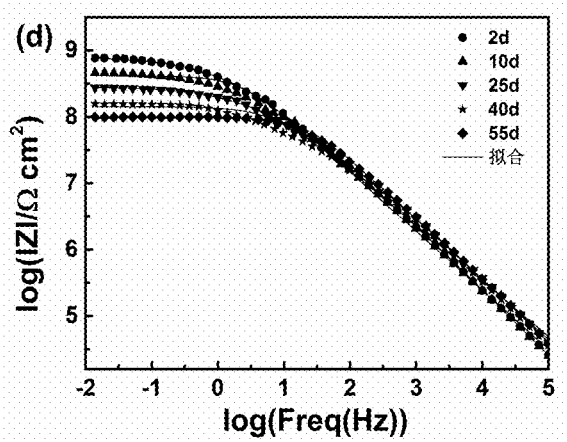
Figure 3E:
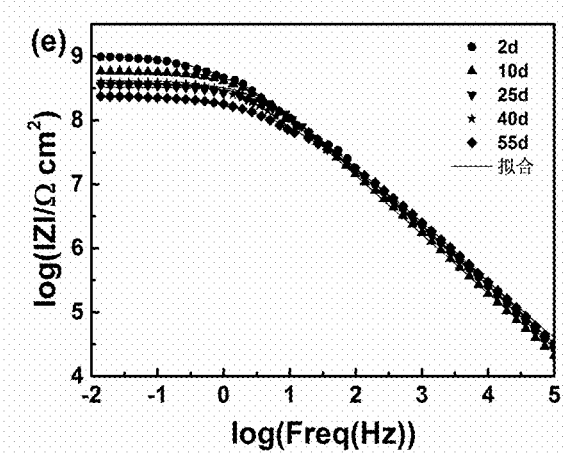

In view of the disadvantages of the prior art, the inventor of the present application proposes the technical solution of the present application via long-term research and lots of practices. The technical solution, implementation process and principle and the like will be further explained below.

In summary, the present application proposes a self-repairing coating based on a graphene nano container and a preparation method thereof, which endows the self-repairing performance of the coating while improving the physical shielding property of the coating, and allows the formed self-repairing coating to exhibit excellent long-term protectiveness and self-repairing performance, and meanwhile the preparation process is simple and environmental friendly.

One aspect of the embodiment of the present application provides paint based on a graphene nano container, comprising:

a first component comprising 20~40 parts by weight of epoxy resin; and a second component comprising 0.1~2 parts by weight of corrosion inhibitor-loaded graphene nano container, 1 part by weight of diluent, 30~60 parts by weight of epoxy curing agent, 1 part by weight of defoaming agent and 1 part by weight of flatting agent;

the corrosion inhibitor-loaded graphene nano container comprising graphene grafted with cyclodextrin and the corrosion inhibitor reversely binding to the cyclodextrin.

Further, the corrosion inhibitor comprises benzotriazole, mercaptobenzothiazole and 8-hydroxyquinoline, but is not limited thereto.

Further, the diluent comprises any one or a combination of more of ethanol and n-butanol, and is not limited thereto.

Further, the epoxy resin comprises any one or a combination of more of E44, E20 and E51, but is not limited thereto.

Further, the foregoing "reverse binding" refers to the fact that the corrosion inhibitor and cyclodextrin grated on the graphene can be separated with each other under another set condition after being bond under a certain condition.

Further, the epoxy curing agent comprises water-based curing agents such as polyamide and anhydride curing agents, but is not limited thereto.

In some embodiments of the present application, firstly, aminocyclodextrin is grafted onto the surface of graphene oxide by adopting a method of combining high-temperature grating and low-temperature condensation, the grated product is reduced by utilizing hydrazine hydrate and the like, and then the reduced product is centrifuged, washed with deionized water and anhydrous ethanol and dried in vacuum to obtain the graphene nano container. Then, the effective loading of the corrosion inhibitor is realized by utilizing a host-guest interaction between cyclodextrin and the corrosion inhibitor (for example benzotriazole, BTA), that is, the corrosion inhibitor-loaded graphene nano container is obtained.

In some particular embodiments, the preparation method of the corrosion inhibitor-loaded graphene nano container comprises:

(1) slowly adding cyclodextrin dispersion solution into graphene oxide dispersion solution to form a first mixture, wherein the mole ratio of carboxyl contained in graphene oxide to amino contained in aminocyclodextrin is 1:1~1:3, reacting the mixture for 20~30 h at 75~85° C., then separating a solid matter, washing, and then dispersing into water to form a second mixture;

(2) dispersing 1.1~1.2 molar parts of 1-3 (dimethylpropyl)-3-ethyl carbodiimide hydrochloride and 1.1~1.3 molar parts of aminocyclodextrin into deionized water to form dispersion solution, and slowly adding the dispersion solution into the second mixture to obtain a third mixture;

(3) reacting the third mixture for 20~30 h at room temperature, then separating a solid matter, washing, and then dispersing into water to form a fourth mixture;

(4) mixing hydroazine hydrate with the fourth mixture and reacting for 4~10 h at room temperature, then separating a solid matter, successively washing and dialyzing to obtain a graphene nano container in which the mass ratio of hydroazine hydrate to graphene oxide is 1:1~1:2; and (5) reacting the graphene nano container and a corrosion inhibitor for 10~20 h at room temperature to form a corrosion inhibitor-loaded graphene nano container in which the mass ratio of the graphene nano container to the corrosion inhibitor is 1:5~1:10.

In some embodiments, the preparation method of the corrosion inhibitor-loaded graphene nano container comprises: in step (1), (3) or (4), after the reaction is ended, centrifuging to separate the reaction mixture, and washing the separated solid matter with deionized water and absolute ethanol. Further, in the centrifugation, the centrifugation rotation speed is 4000~6000 r/m, and time is 4~15 min.

In some embodiments, the preparation method of the corrosion inhibitor-loaded graphene nano container comprises: in step (4), dialyzing the separated solid matter for 4~6 days with a dialysis bag having a molecular weight cut off of 3000~10000, washing with deionized water and absolute ethanol, and then drying in vacuum to obtain the graphene-based nano container.

In some embodiments, the preparation method of the corrosion inhibitor-loaded graphene nano container comprises: in step (5), dispersing the graphene nano container and the corrosion inhibitor which are 1:5~1:10 in mass ratio into an organic solvent to form a fifth mixture, reacting the fifth mixture under the states of room temperature, vacuumizing and stirring to realize the loading of the corrosion inhibitor, and then centrifuging, washing and drying in vacuum to obtain the corrosion inhibitor-loaded graphene nano container.

Preferably, the fifth mixture comprises 30~60 mg/mL corrosion inhibitor.

Further, the organic solvent comprises ethanol, but is not limited thereto.

In some particular embodiments of the present application, the preparation method of the graphene nano container comprises the following steps (unless otherwise stated, "part" is "mole part"):

Step 1: respectively dispersing 1 part of graphene oxide (based on content of carboxy), 1.1~1.3 parts of aminocyclodextrin (based on content of amino) into a certain amount of deionzied water for ultrasonic dispersion, and slowly dropwise adding cyclodextrin dispersion solution to graphene oxide dispersion solution under magnetic stirring to obtain a first reaction mixture.

Step 2: placing the first reaction mixture in 85° C. oil bath to react for 30 h, centrifuging for 15 min, discarding supernatant, washing the sediment on the lower layer with deionized water and absolute ethanol to obtain a precipitate, wherein the process is repeated 3~5 times; and uniformly dispersing the precipitate into water to obtain a second reaction mixture.

Step 3: respectively dispersing 1.1~1.2 parts of 1-(3-dimethylaminopropyl)-3-ethyl carbodiimide hydrochloride (EDC) and 1.1~1.3 parts of aminocyclodextrin into a certain amount of deionized water for ultrasonic dispersion, slowly dropwise adding the dispersion solution to the second reaction mixture under magnetic stirring to obtain a third reaction mixture.

Step 4: reacting the third reaction mixture for 24 h at room temperature, centrifuging for 15 min, discarding supernatant, washing the sediment on the lower layer with deionized water and absolute ethanol to obtain a precipitate, wherein the process is repeated 3~5 times; and uniformly dispersing the precipitate into water to obtain a fourth reaction mixture.

Step 5: adding a certain amount of hydrazine hydrate into the fourth reaction mixture in a mass ratio of 1:1~1:2 (hydrazine hydrate: graphene oxide) to react for 5 h at room temperature, centrifuging for 15 min, discarding the supernatant, washing the sediment on the lower layer with deionized water and absolute ethanol to obtain a precipitate, wherein the process is repeated 3~5 times.

Step 6: dialyzing the above precipitates for 4~6 days, washing with deionized water and absolute ethanol, centrifuging (repeating 3~5 times), and drying in vacuum to obtain the graphene nano container.

Step 7: loading the corrosion inhibitor by utilizing the graphene-based nano container under the states of vacumizing and stirring, wherein the concentration of the corrosion inhibitor is 40~60 mg/mL; and then centrifuging, washing and drying in vacuum to obtain the corrosion inhibitor-loaded graphene nano container.

Another aspect of the embodiment of the present application provides a method for preparing the paint, comprising: mixing the corrosion inhibitor-loaded graphene nano container with a diluent and carrying out ultrasonic dispersion, and then adding a curing agent, a defoaming agent, a flatting agent and other agents, uniformly mixing, and then adding epoxy resin to obtain uniformly dispersed paint.

In some particular embodiments, the preparation method of the paint comprises: sufficiently mixing 0.1~2 parts by weight of corrosion inhibitor-loaded graphene nano container with 1 part by weight of diluent, then adding 30~60 parts by weight of epoxy curing agent, 1 part by weight of defoaming agent and 1 part by weight of flatting agent, and subsequently, sufficiently mixing with 20~40 parts by weight of epoxy resin to prepare the paint.

Another aspect of the embodiment of the present application provides a coating formed by any one paint mentioned above.

In some particular embodiments, the preparation method of the paint comprises (unless otherwise stated, "part" is "part by weight"):

Step 1: mixing 0.1~2 parts of prepared corrosion inhibitor-loaded graphene nano container with 1 part of diluent, magnetically stirring for 10 min, carrying out ultrasonic dispersion for 15 min to obtain a first component.

Step 2: adding 30~60 parts of water-based curing agent, 1 part of defoaming agent and 1 part of flatting agent into the component 1, and magnetically stirring for 1~2 h to obtain a second component.

Step 3: adding 20~40 parts of epoxy resin to the second component to obtain the paint based on the graphene nano container.

Another aspect of the embodiment of the present application provides a preparation method of a self-repairing coating, comprising:

providing any one paint mentioned above; and sufficiently mixing the first component of the paint with the second component, curing for 40~50 h at room temperature, and then curing for 3~5 h at 40~50° C.

In the present application, the preparation method of the self-repairing coating is convenient to operate, green and environmental friendly in raw material, and low in cost. Where, the introduction of the graphene nanosheet effectively improves the shielding performance of the coating, and when the coating is damaged, the graphene nano container can release the corrosion inhibitor molecules, and adsorb and form a protective film on the surface of metal, thereby generating a self-repairing effect.

Correspondingly, another aspect of the embodiment of the present application provides use of the paint or the self-healing coating in metal anticorrosion.

Further, the paint or the self-repairing coating can be widely applied to the fields of ocean facilities, shipping equipment, nuclear power industry and the like.

Next, the technical solution of the present application will be further described in combination with the drawings of the specification and some typical embodiments. It should be noted that various raw materials used in the following examples can be obtained through market purchase or self-made ways. The corresponding reaction equipment, test equipment and the like can also be obtained from the ways known to those skilled in the art, unless otherwise specified.

Example 1 A preparation method of a self-repairing coating based on a graphene nano container in this example comprises:

(1) 1 molar part of graphene oxide (based on carboxyl content) and 1.2 molar parts of aminocyclodextrin (based on amino content) were respectively dispersed into a certain amount of deionized water for ultrasonic dispersion, and cyclodextrin dispersion solution was slowly dropwise added to graphene oxide dispersion solution under magnetic stirring. The above mixture was placed in 85° C. oil bath to react for 30 h, the reaction product was centrifuged for 15 min (a centrifuge rotation speed was 4000~6000 r/min), the supernatant was discarded, and the sediment on the lower layer was washed with deionized water and anhydrous ethanol. The process was repeated for 3~5 times to obtain a precipitate.

(2) 1.2 molar parts of 1-(3-dimethylaminopropyl)-3-ethylcarbodiimide hydrochloride (EDC) and 1.2 molar parts of aminocyclodextrin were respectively dispersed into a certain amount of deionized water, and EDC dispersion solution was slowly dropwise added to the precipitate obtained in step (1) under magnetic stirring. The above mixture was reacted for 20~30 h at room temperature, and then the reaction product was centrifuged (the centrifuge rotation speed was 4000~6000 r/min, the time is 4~15 min, the same below) to obtain a solid matter.

(3) The final precipitate obtained in step (2) was re-dispersed into deionized water, hydrazine hydrate was dropwise added in a mass ratio of 1:2 (hydrazine hydrate: graphene oxide), and the above mixture was magnetically stirred for 5 h at room temperature, centrifuged and washed with deionized water and anhydrous ethanol for three times respectively to obtain a precipitate.

(4) The final precipitate obtained in step (3) was dialyzed for 4~6 days (the molecular weight cut off MW of the dialysis bag was 3000~10000), the dialyzed product was washed with deionized water and anhydrous ethanol and centrifuged, wherein the process was repeated for 3~5 times, and the graphene nano container was obtained by vacuum drying. Its infrared spectrum is shown in FIG. 1.

(5) The graphene nano container and the corrosion inhibitor which were 1:5 in mass ratio were dispersed into an organic solvent such as ethanol, so as to form a fifth mixture, wherein the concentration of the corrosion inhibitor was 30 mg/ml, and the fifth mixture was reacted at room temperature under the states of vacuuming and stirring states to realize the loading of the corrosion inhibitor, and the corrosion inhibitor-loaded graphene nano container was obtained by centrifuging, washing and vacuum drying.

(6) 0.1 part by weight of corrosion inhibitor-loaded graphene nano container was mixed with 1 part by weight of diluent, and the mixture was subjected to magnetic stirring for 10 min and ultrasonic dispersion for 15 min to obtain a first component. 30 parts by weight of water-based curing agent, 1 part by weight of defoaming agent and 1 part by weight of flatting agent were added to first component and then magnetically stirred for 1 h to obtain a second component. 20 parts by weight of epoxy resin was added to the second component to obtain paint based on a graphene nano container.

(7) An carbon steel electrode (1×1 $cm^2$) was ground on SiC sandpaper step by step, and then subjected to ultrasonic treatment with anhydrous ethanol and acetone in turn; the prepared paint was coated on the carbon steel electrode with a wire rod coater, cured for 48 h at room temperature, and then treated for 3 h in a 50° C. oven to form a self-repairing coating (also known as "corrosion inhibitor-loaded graphene nano container/epoxy coating").

The electrode coated with the self-repairing coating was immersed in 3.5 wt % NaCl solution, and the failure process and mechanism of long-term protection of the coating were analyzed by utilizing an electrochemical impedance spectroscopy technology; the self-repairing performance of the coating was studied through a micro area electrochemical local impedance technology.

Example 2 A preparation method of a self-repairing coating based on a graphene nano container in this example comprises:

(1) 1 mole part of graphene oxide (based on carboxyl content) and 1.2 molar parts of aminocyclodextrin (based on amino content) were respectively dispersed into a certain amount of deionized water for ultrasonic dispersion, and cyclodextrin dispersion solution was slowly dropwise added to graphene oxide dispersion solution under magnetic stirring. The above mixture was placed in an 85° C. oil bath to react for 30 h, the reaction product was centrifuged for 15 min (a centrifuge rotation speed was 4000~6000 r/min), the supernatant was discarded, and the sediment on the lower layer was washed with deionized water and anhydrous ethanol. The process was repeated for 3~5 times to obtain a precipitate.

(2) 1.2 molar parts of 1-(3-dimethylaminopropyl)-3-ethylcarbodiimide hydrochloride (EDC) and 1.2 molar parts of aminocyclodextrin were respectively dispersed into a certain amount of deionized water, and EDC dispersion solution was slowly dropwise added to the precipitate obtained in step (1) under magnetic stirring. The above mixture was reacted for 20~30 h at room temperature, and then the reaction product was centrifuged (the centrifuge rotation speed was 4000~6000 r/min, the time is 4~15 min, the same below) to obtain a solid matter;

(3) The final precipitate obtained in step (2) was re-dispersed into deionized water, hydrazine hydrate was dropwise added in a mass ratio of 1:2 (hydrazine hydrate: graphene oxide), and the above mixture was magnetically stirred for 5 h at room temperature, centrifuged and washed with deionized water and anhydrous ethanol for three times respectively to obtain a precipitate.

(4) The final precipitate obtained in step (3) was dialyzed for 4~6 days. The dialyzed product was washed with deionized water and anhydrous ethanol and centrifuged. The process was repeated for 3~5 times, and the graphene nano container was obtained by vacuum drying. Its infrared spectrum is the basically same as that in FIG. 1.

(5) The graphene nano container and the corrosion inhibitor which were 1:10 in mass ratio were dispersed into an organic solvent such as ethanol, so as to form a fifth mixture, wherein the concentration of the corrosion inhibitor was 60 mg/ml, and the fifth mixture was reacted at room temperature under the states of vacuuming and stirring to realize the loading of the corrosion inhibitor. The corrosion inhibitor-loaded graphene nano container was obtained by centrifuging, washing and vacuum drying.

(6) 0.5 part by weight of corrosion inhibitor-loaded graphene nano container was mixed with 1 part by weight of diluent, and the mixture was subjected to magnetic stirring for 10 min and ultrasonic dispersion for 15 min to obtain a first component. 30 parts by weight of water-based curing agent, 1 part by weight of defoaming agent and 1 part by weight of flatting agent were added to first component and then magnetically stirred for 1 h to obtain a second component. 20 parts by weight of epoxy resin was added to the second component to obtain paint based on a graphene nano container.

(7) An carbon steel electrode (1×1 $cm^2$) was ground on SiC sandpaper step by step, and then subjected to ultrasonic treatment with anhydrous ethanol and acetone in turn; the prepared paint was coated on the carbon steel electrode with a wire rod coater, cured for 48 h at room temperature, and then treated for 3 h in a 50° C. oven to form a self-repairing coating (also known as "corrosion inhibitor-loaded graphene nano container/epoxy coating").

The electrode coated with the self-repairing coating was immersed in 3.5 wt % NaCl solution, and the failure process and mechanism of long-term protection of the coating were analyzed by utilizing an electrochemical impedance spectroscopy technology; the self-repairing performance of the coating was studied through a micro area electrochemical local impedance technology.

Example 3 A preparation method of a self-repairing coating based on a graphene nano container in this example comprises:

(1) 1 mole part of graphene oxide (based on carboxyl content) and 1.1 molar parts of aminocyclodextrin (based on amino content) were respectively dispersed into a certain amount of deionized water for ultrasonic dispersion, and cyclodextrin dispersion solution was slowly dropwise added to graphene oxide dispersion solution under magnetic stirring. The above mixture was placed in 85° C. oil bath to react for 30 h, the reaction product was centrifuged for 15 min (a centrifuge rotation speed was 4000~6000 r/min), the supernatant was discarded, and the sediment on the lower layer was washed with deionized water and anhydrous ethanol. The process was repeated for 3~5 times to obtain a precipitate.

(2) 1.1 molar parts of 1-(3-dimethylaminopropyl)-3-ethylcarbodiimide hydrochloride (EDC) and 1.3 molar parts of aminocyclodextrin were respectively dispersed into a certain amount of deionized water, and EDC dispersion solution was slowly dropwise added to the precipitate obtained in step (1) under magnetic stirring. The above mixture was reacted for 20~30 h at room temperature, and then the reaction product was centrifuged (the centrifuge rotation speed was 4000~6000 r/min, the time is 4~15 min, the same below) to obtain a solid matter therein;

(3) The final precipitate obtained in step (2) was re-dispersed into deionized water, hydrazine hydrate was dropwise added in a mass ratio of 1:1 (hydrazine hydrate: graphene oxide), and the above mixture was magnetically stirred for 5 h at room temperature, centrifuged and washed with deionized water and anhydrous ethanol for three times respectively to obtain a precipitate.

(4) The final precipitate obtained in step (3) was dialyzed for 4~6 days. The dialyzed product was washed with deionized water and anhydrous ethanol and centrifuged. The process was repeated for 3~5 times, and the graphene nano container was obtained by vacuum drying. Its infrared spectrum is the basically same as that in FIG. 1.

(5) The graphene nano container and the corrosion inhibitor which were 1:6 in mass ratio were dispersed into an organic solvent such as ethanol, so as to form a fifth mixture, wherein the concentration of the corrosion inhibitor was 40 mg/ml, and the fifth mixture was reacted at room temperature under the states of vacuuming and stirring to realize the loading of the corrosion inhibitor. The corrosion inhibitor-loaded graphene nano container was obtained by centrifuging, washing and vacuum drying.

(6) 1 part by weight of corrosion inhibitor-loaded graphene nano container was mixed with 1 part by weight of diluent, and the mixture was subjected to magnetic stirring for 10 min and ultrasonic dispersion for 15 min to obtain a first component. 30 parts by weight of water-based curing agent, 1 part by weight of defoaming agent and 1 part by weight of flatting agent were added to first component and then magnetically stirred for 1 h to obtain a second component. 20 parts by weight of epoxy resin was added to the second component to obtain paint based on a graphene nano container.

(7) An carbon steel electrode (1×1 cm$^2$) was ground on SiC sandpaper step by step, and then subjected to ultrasonic treatment with anhydrous ethanol and acetone in turn; the prepared paint was coated on the carbon steel electrode with a wire rod coater, cured for 48 h at room temperature, and then treated for 3 h in a 50° C. oven to form a self-repairing coating (also known as "corrosion inhibitor-loaded graphene nano container/epoxy coating").

The electrode coated with the self-repairing coating was immersed in 3.5 wt % NaCl solution, and the failure process and mechanism of long-term protection of the coating were analyzed by utilizing an electrochemical impedance spectroscopy technology; the self-repairing performance of the coating was studied through a micro area electrochemical local impedance technology.

Example 4 A preparation method of a self-repairing coating based on a graphene nano container in this example comprises:

(1) 1 mole part of graphene oxide (based on carboxyl content) and 1.3 molar parts of aminocyclodextrin (based on amino content) were respectively dispersed into a certain amount of deionized water via ultrasonic dispersion, and cyclodextrin dispersion solution was slowly dropwise added to graphene oxide dispersion solution under magnetic stirring. The above mixture was placed in 85° C. oil bath to react for 30 h, the reaction product was centrifuged for 15 min (a centrifuge rotation speed was 4000~6000 r/min), the supernatant was discarded, and the sediment on the lower layer was washed with deionized water and anhydrous ethanol. The process was repeated for 3~5 times to obtain a precipitate.

(2) 1.1 molar parts of 1-(3-dimethylaminopropyl)-3-ethylcarbodiimide hydrochloride (EDC) and 1.1 molar parts of aminocyclodextrin were respectively dispersed into a certain amount of deionized water, and EDC dispersion solution was slowly dropwise added to the precipitate obtained in step (1) under magnetic stirring. The above mixture was reacted for 20~30 h at room temperature, and then the reaction product was centrifuged (the centrifuge rotation speed was 4000~6000 r/min, the time is 4~15 min, the same below) to obtain a solid matter therein;

(3) The final precipitate obtained in step (2) was re-dispersed into deionized water, hydrazine hydrate was dropwise added in a mass ratio of 1:2 (hydrazine hydrate: graphene oxide), and the above mixture was magnetically stirred for 5 h at room temperature, centrifuged and washed with deionized water and anhydrous ethanol for three times respectively to obtain a precipitate.

(4) The final precipitate obtained in step (3) was dialyzed for 4~6 days. The dialyzed product was washed with deionized water and anhydrous ethanol and centrifuged. The process was repeated for 3~5 times, and the graphene nano container was obtained by vacuum drying. Its infrared spectrum is the basically same as that in FIG. 1.

(5) The graphene nano container and the corrosion inhibitor which are 1:8 in mass ratio were dispersed into organic solvents such as ethanol, so as to form a fifth mixture, wherein the concentration of the corrosion inhibitor was 50 mg/ml, and the fifth mixture was reacted at room temperature under the states of vacuuming and stirring to realize the loading of the corrosion inhibitor. After centrifugation, water washing and vacuum drying, the corrosion inhibitor-loaded graphene nano container was obtained.

(6) 2 parts by weight of corrosion inhibitor-loaded graphene nano container was mixed with 1 part by weight of diluent, and the mixture was subjected to magnetic stirring for 10 min and ultrasonic dispersion for 15 min to obtain a first component. 30 parts by weight of water-based curing agent, 1 part by weight of defoaming agent and 1 part by weight of flatting agent were added to first component and then magnetically stirred for 1 h to obtain a second component. 20 parts by weight of epoxy resin was added to the second component to obtain paint based on a graphene nano container.

(7) An carbon steel electrode (1×1 cm$^2$) was ground on SiC sandpaper step by step, and then subjected to ultrasonic treatment with anhydrous ethanol and acetone in turn; the prepared paint was coated on the carbon steel electrode with a wire rod coater, cured for 48 h at room temperature, and then treated for 3 h in a 50° C. oven to form a self-repairing coating (also known as "corrosion inhibitor-loaded graphene nano container/epoxy coating").

The electrode coated with the self-repairing coating was immersed in 3.5 wt % NaCl solution, and the failure process and mechanism of long-term protection of the coating were analyzed by utilizing an electrochemical impedance spectroscopy technology; the self-repairing performance of the coating was studied through a micro area electrochemical local impedance technology.

Control example 1 A preparation method of a pure epoxy resin in this control example comprises:

1 part of defoaming agent, 1 part of flatting agent and 1 part of diluent were added into 30 parts of epoxy curing agent and magnetically stirred for 1 h to obtain a first component; 20 parts of epoxy resin was added into the first component to obtain epoxy paint.

An carbon steel electrode ($1 \times 1$ cm$^2$) was ground on SiC sandpaper step by step, and then subjected to ultrasonic treatment with anhydrous ethanol and acetone in turn; the prepared paint was coated on the carbon steel electrode with a wire rod coater, cured for 48 h at room temperature, and then treated for 3 h in a 50° C. oven to form an epoxy coating.

The electrode coated with the coating was immersed in 3.5 wt % NaCl solution, and the failure process and mechanism of long-term protection of the coating were analyzed by utilizing an electrochemical impedance spectroscopy technology; the self-repairing performance of the coating was studied through a micro area electrochemical local impedance technology.

Control example 2 A preparation method of a graphene nano container/epoxy coating in this control example comprises:

(1) 1 molar part of graphene oxide (based on carboxyl content) and 1.2 molar parts of aminocyclodextrin (based on amino content) were respectively dispersed into a certain amount of deionized water for ultrasonic dispersion, and cyclodextrin dispersion solution was slowly dropwise added to graphene oxide dispersion solution under magnetic stirring. The above mixture was placed in 85° C. oil bath to react for 30 h, the reaction product was centrifuged for 15 min (the centrifuge rotation speed was 4000~6000 r/min), the supernatant was discarded, and the sediment on the lower layer was washed with deionized water and anhydrous ethanol. The process was repeated for 3~5 times to obtain a precipitate.

(2) 1.2 molar parts of 1-(3-dimethylaminopropyl)-3-ethylcarbodiimide hydrochloride (EDC) and 1.2 molar parts of aminocyclodextrin were respectively dispersed into a certain amount of deionized water, and EDC dispersion solution was slowly dropwise added to the precipitate obtained in step (1) under magnetic stirring. The above mixture was reacted for 20~30 h at room temperature, and then the reaction product was centrifuged (centrifugation rotation speed was 4000~6000 r/min, time is 4~15 min, the same below) to obtain a solid matter;

(3) The final precipitate obtained in step (2) was re-dispersed into deionized water, hydrazine hydrate was dropwise added in a mass ratio of 1:2 (hydrazine hydrate: graphene oxide), and the above mixture was magnetically stirred for 5 h at room temperature, centrifuged and washed with deionized water and anhydrous ethanol for three times respectively to obtain a precipitate.

(4) The final precipitate obtained in step (3) was dialyzed for 4~6 days. The dialyzed product was washed with deionized water and anhydrous ethanol and centrifuged. The process was repeated for 3~5 times, and the graphene nano container was obtained by vacuum drying.

(5) 0.5 part (mass ratio) of graphene nano container was mixed with 1 part of diluent, and the mixture was subjected to magnetic stirring for 10 min and ultrasonic dispersion for 15 min to obtain a first component. 30 parts by weight of water-based curing agent, 1 part by weight of defoaming agent and 1 part by weight of flatting agent were added to the first component and then magnetically stirred for 1 h to obtain a second component. 20 parts by weight of epoxy resin was added to the second component to obtain paint based on a graphene nano container.

An carbon steel electrode ($1 \times 1$ cm$^2$) was ground on SiC sandpaper step by step, and then subjected to ultrasonic treatment with anhydrous ethanol and acetone in turn; the prepared paint was coated on the carbon steel electrode with a wire rod coater, cured for 48 h at room temperature, and then treated for 3 h in a 50° C. oven to form a coating (also known as "corrosion inhibitor-loaded graphene nano container/epoxy coating").

The electrode coated with the coating was immersed in 3.5 wt % NaCl solution, and the failure process and mechanism of long-term protection of the coating were analyzed by utilizing an electrochemical impedance spectroscopy technology; the self-repairing performance of the coating was studied through a micro area electrochemical local impedance technology.

Control example 3 A preparation method of a graphene oxide/epoxy coating in this control example comprises:

(1) 0.5 part by weight of commercially available graphene oxide was mixed with 1 part by weight of diluent, and the mixture was subjected to magnetic stirring for 10 min and ultrasonic dispersion for 15 min to obtain a first component. 30 parts by weight of water-based curing agent, 1 part by weight of defoaming agent and 1 part by weight of flatting agent were added to the first component and then magnetically stirred for 1 h to obtain a second component. 20 parts by weight of epoxy resin was added to the second component to obtain paint based on graphene oxide.

(2) An carbon steel electrode ($1 \times 1$ cm$^2$) was ground on SiC sandpaper step by step, and then subjected to ultrasonic treatment with anhydrous ethanol and acetone in turn; the prepared paint was coated on the carbon steel electrode with a wire rod coater, cured for 48 h at room temperature, and then treated for 3 h in a 50° C. oven to form a coating.

The electrode coated with the coating was immersed in 3.5 wt % NaCl solution, and the failure process and mechanism of long-term protection of the coating were analyzed by utilizing an electrochemical impedance spectroscopy technology; the self-repairing performance of the coating was studied through a micro area electrochemical local impedance technology.

Control example 4 A preparation method of a corrosion inhibitor-reduced graphene oxide/epoxy coating in this control example comprises:

(1) commercially available graphene oxide was dispersed into deionized water, hydrazine hydrate was dropwise added in a mass ratio of 1:2 (hydrazine hydrate:graphene oxide), the mixture was magnetically stirred for 5 h at room temperature and centrifuged for 15 min (centrifugation rotation speed was 4000~6000 r/min), a precipitate was obtained by respectively washing three times with deionized water and anhydrous ethanol, and reduced graphene oxide was obtained by vacuum drying.

(2) The reduced graphene oxide reacted with a corrosion inhibitor for 10~20 h at room temperature to realize the loading of the corrosion inhibitor. In the reaction system, the concentration of the corrosion inhibitor was 30~60 mg/mL, the mass ratio of reduced graphene oxide to the corrosion inhibitor was 1:5~1:10. The corrosion inhibitor-loaded reduced graphene oxide was obtained by centrifuging, washing and vacuum drying.

(3) 0.5 part by weight of corrosion inhibitor-loaded reduced graphene oxide was mixed with 1 part by weight of diluent, and the mixture was subjected to magnetic stirring for 10 min and ultrasonic dispersion for 15 min to obtain a first component. 30 parts by weight of water-based curing agent, 1 part by weight of defoaming agent and 1 part by weight of flatting agent were added to the first component and then magnetically stirred for 1 h to obtain a second component. 20 parts by weight of epoxy resin was added to the second component to obtain paint based on reduced graphene oxide.

(4) An carbon steel electrode (1×1 cm$^2$) was ground on SiC sandpaper step by step, and then subjected to ultrasonic treatment with anhydrous ethanol and acetone in turn; the prepared paint was coated on the carbon steel electrode with a wire rod coater, cured for 48 h at room temperature, and then treated for 3 h in a 50° C. oven to form a coating.

The electrode coated with the coating was immersed in 3.5 wt % NaCl solution, and the failure process and mechanism of long-term protection of the coating were analyzed by utilizing an electrochemical impedance spectroscopy technology; the self-repairing performance of the coating was studied through a micro area electrochemical local impedance technology.

Referring to FIG. 2a-FIG. 2e, they respectively show scanning electron micrographs of cross sections of a pure epoxy coating in control example 1, a graphene oxide/epoxy coating in control example 3, a corrosion inhibitor-reduced graphene oxide/epoxy coating in control example 4, a graphene nano container/epoxy coating in control example 2 and a corrosion inhibitor-loaded graphene nano container/epoxy coating in example 1 according to the present application.

Referring to FIG. 3a-FIG. 3e again, they respectively show electrochemical impedance spectrums of a pure epoxy coating in control example 1, a graphene oxide/epoxy coating in control example 3, a corrosion inhibitor-reduced graphene oxide/epoxy coating in control example 4, a graphene nano container/epoxy coating in control example 2 and a corrosion inhibitor-loaded graphene nano container/epoxy coating in control example 1 in 3.5 wt % NaCl solution at different soaking times according to the present application.

The self-repairing coating obtained in other examples of the present application also has sectional morphology and anticorrosion performance similar to those of the self-repairing coating in example 1.

It should be understood that the above examples are only for illustrating the technical concept and features of the present application, and the purpose is to allow people familiar with the technology to understand the content of the present application to implement it, but not to accordingly limit the scope of protection of the present application. Any equivalent changes or modifications made in accordance with the spirit of the present application shall be included within the scope of protection of the present application.

What is claimed is:

1. Paint based on a graphene nano container, comprising:
   a first component comprising 20 to 40 parts by weight of epoxy resin;
   a second component comprising 0.1 to 2 parts by weight of corrosion inhibitor-loaded graphene nano container, 1 part by weight of diluent, 30 to 60 parts by weight of epoxy curing agent, 1 part by weight of defoaming agent and 1 part by weight of flatting agent;
   the corrosion inhibitor-loaded graphene nano container comprising graphene grafted with cyclodextrin and a corrosion inhibitor reversely binding to the cyclodextrin;
   wherein a method for preparing the corrosion inhibitor-loaded graphene nano container comprises:
   (1) slowly adding cyclodextrin dispersion solution into graphene oxide dispersion solution to form a first mixture, wherein the mole ratio of carboxyl contained in graphene oxide to amino contained in aminocyclodextrin is 1:1 to 1:3, reacting the first mixture for 20 to 30h at 75 to 85° C., then separating a solid matter, washing, and then dispersing into water to form a second mixture;
   (2) dispersing 1.1 to 1.2 molar parts of 1-(3-dimethylpropyl)-3-ethyl carbodiimide hydrochloride and 1.1 to 1.3 molar parts of aminocyclodextrin into deionized water to form dispersion solution, and slowly adding the dispersion solution into the second mixture to obtain a third mixture;
   (3) reacting the third mixture for 20 to 30h at room temperature, then separating a solid matter; washing, and then dispersing into water to form a fourth mixture;
   (4) mixing hydroazine hydrate with the fourth mixture and reacting for 4 to 10h at room temperature, then separating a solid matter, successively washing and dialyzing to obtain a graphene nano container in which the mass ratio of hydroazine hydrate to graphene oxide is 1:1 to 1:2; and
   (5) reacting the graphene nano container with the corrosion inhibitor for 10 to 20h at room temperature to form the corrosion inhibitor-loaded graphene nano container in which the mass ratio of the graphene nano container to the corrosion inhibitor is 1:5 to 1:10.

2. The paint according to claim 1, wherein the corrosion inhibitor comprises any one of benzotriazole, mercaptobenzothiazole and 8-hydroxyquinoline, or a combination of two or more thereof; and/or the diluent comprises absolute ethanol; and/or the epoxy resin comprises any one of E44, E20 and E50, or a combination of two or more thereof; and/or the epoxy curing agent comprises a polyamide or anhydride curing agent.

3. The paint according to claim 1, wherein the preparation method comprises: in step (1), (3) or (4), the separating a solid matter and washing comprises:
   centrifuging to separate the reaction mixture, and washing the separated solid matter with deionized water and absolute ethanol, wherein the adopted centrifugation rotation speed is 4000 to 6000r/min, and centrifugation time is 4 to 15 min; and/or in step (4), dialyzing the separated solid matter for 4 to 6 days with a dialysis bag having a molecular weight cut off of 3000 to 10000, washing with deionized water and absolute ethanol, and drying in vacuum to obtain a graphene-based nano container.

4. The paint according to claim 1, wherein the preparation method comprises: in step (5), dispersing the graphene nano container and the corrosion inhibitor which are 1:5 to 1:10 in mass ratio into an organic solvent to form a fifth mixture, reacting the fifth mixture under the states of room temperature, vacuumizing and stirring to realize the loading of the corrosion inhibitor, and then centrifuging, washing and drying in vacuum to obtain the corrosion inhibitor-loaded graphene nano container.

5. The paint according to claim 4, wherein the fifth mixture contains 30 to 60 mg/mL corrosion inhibitor; and/or the organic solvent comprises ethanol.

6. A self-repairing coating formed by the paint according to claim 1.

7. A preparation method of a self-repairing coating, comprising:
- providing the paint according to claim 1; and
- sufficiently mixing the first component of the paint with the second component, curing for 40 to 50h at room temperature, and then curing for 3 to 5h at 40 to 60° C.

* * * * *